United States Patent
Stehle et al.

(10) Patent No.: US 8,585,546 B2
(45) Date of Patent: Nov. 19, 2013

(54) PROCESS OF CONTROLLING A DRIVE TRAIN OF A MOTOR VEHICLE

(75) Inventors: Bjoern Stehle, Buehlertal (DE); Alexander Schweizer, Buehl (DE); Gerald Kuestler, Gaggenau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 392 days.

(21) Appl. No.: 12/479,439

(22) Filed: Jun. 5, 2009

(65) Prior Publication Data

US 2009/0312149 A1 Dec. 17, 2009

(30) Foreign Application Priority Data

Jun. 12, 2008 (DE) .......................... 10 2008 028 185

(51) Int. Cl.
*B60W 10/00* (2006.01)
(52) U.S. Cl.
USPC .............................................. 477/92; 477/94
(58) Field of Classification Search
USPC .................... 477/92, 94–96, 906; 701/62, 71; 192/215–226
See application file for complete search history.

(56) References Cited

U.S. PATENT DOCUMENTS

| | | | | |
|---|---|---|---|---|
| 4,884,669 A * | 12/1989 | Ehrlinger | ...................... | 192/216 |
| 6,213,564 B1 * | 4/2001 | Face, Jr. | ........................... | 303/3 |
| 6,554,738 B1 * | 4/2003 | Bek | ................ | 477/107 |
| 6,916,270 B2 * | 7/2005 | Genise | ......................... | 477/102 |
| 7,349,770 B2 * | 3/2008 | Matsuzaki et al. | ................ | 701/1 |
| 7,860,629 B2 * | 12/2010 | Schweizer et al. | ............... | 701/51 |
| 2005/0075773 A1 * | 4/2005 | Schweizer et al. | ............... | 701/51 |

FOREIGN PATENT DOCUMENTS

| | | | | |
|---|---|---|---|---|
| CN | 102182796 A | * | 9/2011 | |
| DE | 19926697 A1 | * | 12/2000 | |
| JP | 08219278 A | * | 8/1996 | |
| KR | 2001045893 A | * | 6/2001 | |
| WO | WO 0133064 A1 | * | 5/2001 | |

* cited by examiner

*Primary Examiner* — Tisha Lewis
(74) *Attorney, Agent, or Firm* — Simpson & Simpson, PLLC

(57) ABSTRACT

A process for controlling a drive train with an internal combustion engine, a transmission and an automatically actuated brake system. In the event of a defect of the transmission, retardation is effected by means of the automatically actuated brake system in order to avoid impermissibly high speeds in the drive train.

1 Claim, 1 Drawing Sheet

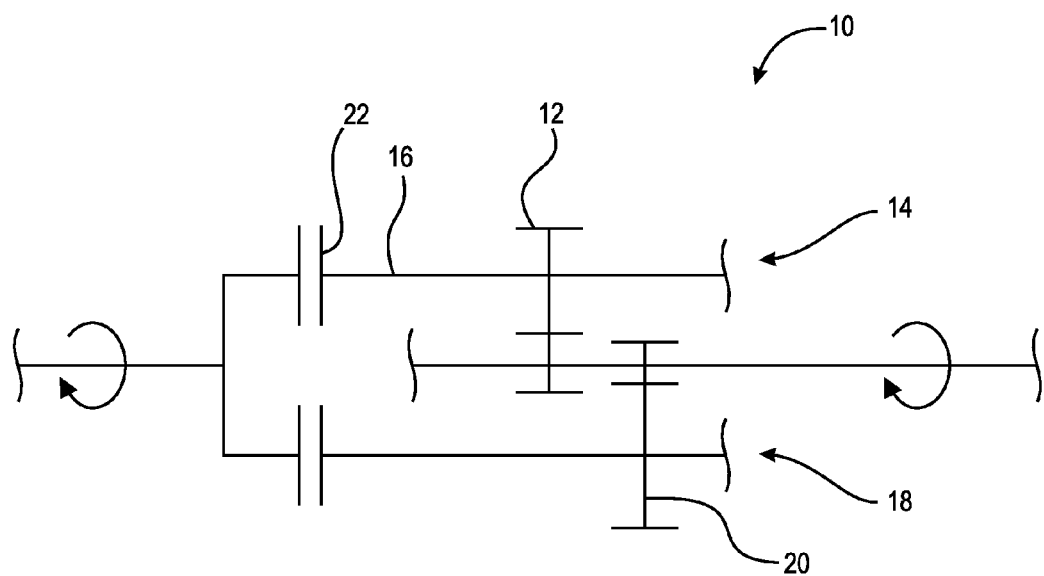

PROCESS OF CONTROLLING A DRIVE TRAIN OF A MOTOR VEHICLE

CROSS-REFERENCE TO RELATED APPLICATIONS

The present application claims priority from German Patent Application No. 10 2008 028 185.9, filed on Jun. 12, 2008, which application is incorporated herein by reference.

FIELD OF THE INVENTION

The invention relates to a process of controlling a drive train with an internal combustion engine, an automated transmission and an automatically actuated brake system.

BACKGROUND OF THE INVENTION

Such drive trains are used in power plant vehicles. The automatically operated transmissions are thereby controlled by means of actuators. In case of a mechanical defect or of a defect of the transmission control, the vehicle can inadvertently accelerate to high rotational speeds and/or constituent parts of the transmission and/or a clutch disposed between the internal combustion engine and transmission.

It was already provided in such drive trains that the torque of the internal combustion engine present at the transmission be reduced in the event of a defect. Such a measure only intervenes in a limited manner to reduce the vehicle speed because the drag torque of the internal combustion engine thus caused by the reduction of torque and an open clutch between the internal combustion engine and transmission becomes ineffective.

BRIEF SUMMARY OF THE INVENTION

The task of the invention is therefore to improve such drive trains in order to handle defects of the transmission more effectively.

The task is solved by means of a process of controlling a drive train of a motor vehicle with an internal combustion engine and an automated transmission as well as an automatic brake system for retarding the motor vehicle, wherein in the case of a defect of the transmission the motor vehicle is retarded by means of the automatic brake system. Thereby, the brake system is preferably put at disposal by a service brake, for instance, for braking at least one wheel. A transmission brake can also be used alternatively or additionally, for instance retarder equipment that retards a driven element of the transmission, for instance the driven shaft or transmission output shaft.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1 is a schematic representation of a parallel shift transmission.

DETAILED DESCRIPTION OF THE INVENTION

A braking effect can be attained alternatively or additionally in a hybrid vehicle by means of recuperation. This can occur for instance by operating an electric machine and charging a battery associated with it. Coupling of flywheels can also take place alternatively or additionally. In particular, with commercial vehicles, also active transmission brakes can be used alternatively or additionally.

The failure of a transmission actuator controlled by a control device or the failure of the control device itself can constitute the defect of the transmission. A transmission actuator can be operated electrically, hydraulically, pneumatically or in a similar manner and in turn actuate an automated manual shift transmission, a parallel shift transmission like twin-clutch transmission or other power shift transmission or transmission shifting under gear rattle. The transmission actuator can hence incorporate a linear-actuated controller drum or a shift shaft that is movable in select and shift direction, which engages with corresponding shift geometries like shift guides, selector forks and sleeves.

FIG. 1 is a schematic representation of parallel shift transmission 10. A defect in the transmission for instance can cause an engaged gear not to be disengaged. Under certain circumstances this leads to high rotation speed stress on the transmission or clutch components, which can be damaged by this, in that, they burst. For instance, a blocked gear 12 in a partial drive train 14 of a parallel shift transmission 10 with a corresponding ratio, the transmission input shaft 16 of this partial drive train 18 is operated with a gear 20 with a higher ratio, is accelerated such that the friction clutch 22 assigned to partial drive train 14 suffers damage. If the ratios of the two affected gears differ by factor two, for instance, the speed of the transmission input shaft 16 will be doubled by the blocked gear.

Due to braking of the automatic brake system when a transmission defect is detected, immediate intervention in the speed of the motor vehicle can occur independently of the prevailing torque of the internal combustion engine and excess speeds can be caused in the transmission even with an open clutch between the internal combustion engine and the transmission and/or on inclines. In addition, the prevailing torque of the internal combustion engine in the case of the defect on the transmission can be reduced by an intervention in the control unit of the internal combustion engine.

A braking effect can be attained advantageously through recuperation in hybrid vehicles. This can occur by operating an electric machine and charging a battery associated with it. Alternatively or additionally, one or several flywheels can be coupled advantageously for the purpose of recuperation. Active transmission brakes can also be used advantageously to obtain a braking effect.

In motor vehicles with an electronic stabilization program (ESP) the latter can be used advantageously as an automatic brake system. By means of the electronic stabilization program, individual wheels can be retarded specifically so that when a transmission defect occurs the motor vehicle can be retarded immediately without safety losses even when cornering. Thereby, the transmission status can be transmitted advantageously via a communication device, for instance CAN-bus to a control device of the automatic brake system, for instance to the ESP-control device. If transmission status is not transmitted, the brake system can be activated because, in this case, the control device of the transmission may have failed completely and thus the control of the transmission no longer takes place in case a gear is selected.

The motor vehicle can be retarded to a suitable speed of the motor vehicle despite a defect of the transmission. Furthermore, further increase of the speed, for instance, downhill can be prevented. The retardation to a preselected speed can be predetermined depending on a gear selected in the transmission. The control device computes a suitable speed from a transmission status that contains the gear information, which is not harmful to the drive train in the presence of the defect, and retards the vehicle to the default speed. Alternatively, a transmission status can be transmitted to the control device of the brake system, which contains information of a limit speed already computed by the transmission control unit, thus which is not harmful to the transmission or to the clutch assigned to the latter. The control device of the brake system hence retards the motor vehicle to this speed, at least for so long until the defect is eliminated or a workshop is visited.

What we claim is:

1. A process for controlling a drive train of a motor vehicle with an internal combustion engine, an automated parallel shift transmission with first and second partial drive trains, and an automatic brake system, the process comprising:
- detecting a blocked gear in the first partial drive train of the automated parallel shift transmission while the vehicle is in motion; and,
- operating the automatic brake system to retard the motor vehicle, wherein:
  - when the transmission input shaft of the first partial drive train is accelerated when the second partial drive train is operated with a gear with a higher ratio than the blocked gear.

* * * * *